United States Patent [19]

Ewing et al.

[11] 4,023,835
[45] May 17, 1977

[54] CONFORMABLE THIN-WALL SHEAR-RESISTANT COUPLING AND PIPE ASSEMBLY

[75] Inventors: Lloyd Ewing, Milwaukee; Michael J. Bykowski, West Bend, both of Wis.

[73] Assignee: Ewing Engineering Company, Milwaukee, Wis.

[22] Filed: May 2, 1975

[21] Appl. No.: 574,118

[52] U.S. Cl. .......................... 285/235; 24/115 N; 138/130; 156/173; 285/305; 285/DIG. 16; 403/291

[51] Int. Cl.² .......................................... F16L 21/00

[58] Field of Search .......... 285/235, 305, 239, 259, 285/DIG. 16, 236, 423; 403/291; 24/115 N, 122.3, 31 C; 174/84 R; 138/130, 138, 124

[56] References Cited
UNITED STATES PATENTS

| | | | |
|---|---|---|---|
| 839,260 | 12/1906 | Benson | 403/291 X |
| 1,473,362 | 11/1923 | Tilton | 285/305 X |
| 2,189,987 | 2/1940 | Kellems | 285/305 X |
| 2,434,358 | 1/1948 | Frank | 285/305 X |
| 2,711,331 | 6/1955 | Temple | 285/236 X |
| 3,186,048 | 6/1965 | Tann | 24/31 C |
| 3,210,100 | 10/1965 | Lowles et al. | 285/259 X |
| 3,453,006 | 7/1969 | Levake | 285/235 X |
| 3,453,006 | 7/1969 | Levake | 285/235 X |
| 3,558,164 | 1/1971 | Havell | 285/236 |
| 3,756,631 | 9/1973 | Ross et al. | 285/DIG. 16 X |
| 3,848,904 | 11/1974 | Anderson | 285/DIG. 16 X |

FOREIGN PATENTS OR APPLICATIONS

| | | | |
|---|---|---|---|
| 627,278 | 8/1949 | United Kingdom | 285/235 |
| 159,762 | 3/1921 | United Kingdom | 403/291 |

Primary Examiner—Thomas F. Callaghan
Attorney, Agent, or Firm—Pollock, Vande Sande & Priddy

[57] ABSTRACT

Lengths of "plain-end" pipe are joined together in underground sewer or drainage systems by flexible sleeves having a specified column expansibility and shear-resistance and containing high modulus helically oriented reinforcement, bonded or encapsulated in elastomeric material. The resultant pipe assemblies represent a significant improvement over previously known "plain-end" pipe-coupling arrangements and bell and spigot pipe assemblies. Pipe sections may be quickly and economically joined without inserting packing, to provide a water-tight, shear-resistant joint which will accomodate significant angular misalignment and circumferential variation. Even if lubricant is placed on the inner surfaces of the flexible sleeves to reduce assembly forces, the resultant pipe assemblies still exhibit more than adequate resistance against shear loads and water infiltration.

64 Claims, 5 Drawing Figures

CONFORMABLE THIN-WALL SHEAR-RESISTANT COUPLING AND PIPE ASSEMBLY

BACKGROUND OF THE INVENTION

Leaking of underground water into sewer and drain pipe systems wastefully reduces the cost-effectiveness of these systems and of any waste water treatment plants into which they feed. Thus, municipal authorities have, for quite a few years, specified that the joints between successive lengths of drainage and sewer pipe should be water tight. This requirement has, in turn, sparked a long-standing and still continuing search for ways of joining underground pipe sections together quickly and economically in a way which will provide a water tight joint, notwithstanding the circumferential variations of the pipe sections themselves and the shear forces and angular misalignment resulting from earth settlement and installation conditions and practices.

Attempts to meet this requirement with the familiar bell and spigot type of sewer pipe have involved providing packing between the interior surface of the bell and the free end or spigot of the next adjacent length of pipe which is inserted into the bell. A wide variety of different kinds of packing have been used, including for example: hardenable paste-like preparations; fiber "rope", e.g. hemp packing; O-rings; and a variety of other types of flexible seals.

Much has been written about the special care and problems involved with bell and spigot pipes and packing. Although some researchers have probed the use of so-called "plain-end" pipes—having walls of uniform diameter throughout their length — and of joining them by short cylindrical couplings of various configurations, the present inventors know of no widely accepted coupling of this type which is sufficiently shear resistant. The bell and spigot has been for decades — and still is today — the dominant factor in the sewage and drainage pipe field.

And the dominance of the bell and spigot type of pipe has continued notwithstanding knowledge in the art that "plain-end" pipe has certain economic advantages, especially in the case of vitrified clay pipe. Because such "plain-end" pipe has no bell, the sections of pipe may be stacked closer together in the dryers and kilns used in manufacturing the pipe. The productivity of the dryers and kilns can be increased, while simultaneously increasing the number of pipe sections which can be processed with a given amount of fuel. Also, pipe sections formed without bells seem to be less prone to cracking during manufacture, so that less scrap is produced. Unfortunately, a completely satisfactory solution to the challenge of satisfactorily coupling "plain-end" pipe sections has defied years of research.

Some of the available types of cylindrical couplings for plain end pipe are costly. Others are not sufficiently durable or effective. Some fail to remain water tight when subjected to substantial shear force and/or axial misalignment. Still others are effective only when the pipe ends are substantially free of circumferential variation, e.g. variations in roundness and circumferential length. The costs which would be involved in manufacturing clay pipe free of such variations has thus far been a prohibitive factor in the adoption of the last-mentioned couplings.

Thus, a need remains for underground sewer or drainage pipe couplings and coupling-pipe combinations which can be quickly and easily joined in the field to form pipe assemblies having stable joints, e.g. joints which can accomodate the usual circumferential variations in clay pipe and yet remain water tight when subjected to substantial shear force and axial misalignment. It is the object of the present invention to meet this long-standing need.

BRIEF SUMMARY OF THE INVENTION

The invention involves the discovery that a flexible sleeve having a certain combination of structural properties and elements makes an excellent pipe coupling, solving a number of long-standing problems. Couplings formed with the below-described properties, having a specified combination of elastomeric binder and helically oriented fiber, increase in diameter upon axial compression thereof and decrease in diameter in response to axial tensile forces exerted thereon. Thus, when such a coupling is already connected to one pipe, with a portion of the coupling extending free, it is a simple task to connect a second pipe. The coupling will enlarge to facilitate its entry. The joint is completed as soon as it is pushed together.

The coupling diminishes in size when one tries to pull the pipe out of it. The coupling generates pullout resistance substantially in excess of that which would be provided by the mere hoop-stress elasticity of the elastomer material in a plain elastomer sleeve. The harder one tries to pull out the pipe, the harder the coupling grips it. Thus, the coupling will hold satisfactorily under surprisingly adverse conditions, e.g. when it is wet, dirty or smeared with lubricant. The coupling also internally generates resistance to shear and accomodates bending.

Because of the remarkable stability of the resultant pipe joints, less stringent installation practices will suffice. These advantages can be attained with a thin wall coupling and plain-end pipe. No bell-holes need be dug, such as are provided to accommodate the bells of bell and spigot pipes. Because of the foregoing, pipe assemblies with highly stable joints can be quickly and economically installed.

The couplings, when viewed in transverse cross-section, define closed, convexly rounded figures having a wall thickness in the range of about 0.006D to about 0.09D. Throughout the present specification and claims, D refers to the nominal diameter (in inches) of the pipe which is, or is intended to be, assembled with the coupling to make a joint.

One property of the couplings of the invention is a column expansibility of at least $2 \times 10^{-4}$ inches per pound. This is the circumferential increase of the coupling, per unit of circumference, per unit of force, per unit of circumference, when the coupling is compressed axially between parallel flat plates.

Moreover, the conduits are also characterized by a shear resistance providing a deflection of less than 0.12 inches per inch (inches of deflection per inch of pipe diameter, nominal). For purposes of this definition deflection is measured while a coupling and its immediately adjoining pipe sections are subjected to a transverse shear load of 150D pounds, while maintaining their axes essentially parallel.

When couplings are fabricated with a fiber-reinforced elastomer composite containing sufficient quantities of fiber and elastomer for providing the above-indicated column expansibility and shear resistance, highly advantageous couplings, coupling-pipe combinations and pipe assemblies can be produced.

The fibers referred to above have a modulus of at least about $6 \times 10^6$ psi. The fibers are oriented in an opposed, balanced helical pattern or patterns at a helix angle in the range of about 45° to about 75°. For purposes of this specification and claims, the helix angle is measured from a reference line parallel to the coupling axis with the coupling in an unstressed condition. In any given layer of said fibers the aforementioned helix angle is generally uniform throughout the length of the coupling. If there is a plurality of spaced layers of fibers in helical patterns, the helix angle in one layer may be the same as or different from the helix angle in another layer.

The elastomer referred to above is an elastomeric binder which mechanically interconnects the opposed fibers at the above-indicated helix angle. More particularly, it assists in maintaining the shape of the coupling, fills the space between fibers, fixes the fiber alignment and transmits and distributes loads to and among the fibers. In general, the binder has a modulus which is substantially lower than that of the fiber. At 100% elongation, the binder should have a modulus of at least about 25 psi and at 300% elongation it should have a modulus of at least about 50 psi. The Shore A durometer hardness of the binder measured without the helical fiber, should be in the range of about 15 to about 90. The tensile strength should be at least about 300 psi.

In the above-described coupling-pipe combinations, a single cylindrical section of pipe is connected, e.g. gripped, by one of the aforementioned couplings in partially overlapping or telescoping relationship with at least about half or more of the length of the coupling extending free of the end of the pipe. The connection may be by way of mere frictional gripping, but preferably the coupling is adhesively bonded to the pipe section. The portion of the sleeve which extends free of the pipe provides a flexible push-type coupling into which the end of an adjoining pipe section may be inserted.

The pipe sections contemplated by the present invention, when viewed in transverse cross-section, define closed, convexly rounded figures. In general, these pipe sections will have sufficient circumferential rigidity, so that their circumference will not change more than about 1% on application of 100 pounds per square inch radial pressure thereto. In order to provide an interference fit with the coupling, the pipe sections will generally have a circumference greater than the inside diameter of the coupling (measured when the latter is in unstressed condition). The oversize of the pipe section may range up to about 8% of the inside circumference of the coupling. The aforementioned pipe shape, circumferential rigidity and interference fit co-act to transfer shear forces from the conduit sections to the fibers of the couplings.

The invention also provides a method of manufacturing a push-type, expansible, thin-wall, shear-resistant pipe coupling including at least one layer of helical reinforcing fiber which, throughout the length of the layer, is uniformaly angled relative to the coupling axis. A liner layer, preferably an elastomeric solid having the durometer value below, is releasably applied to a rigid convexly rounded supporting member. Continuous filament fiber material having a modulus of at least about $6 \times 10^6$ is wetted with liquid resin curable to an elastomer having a durometer (Shore A) hardness in the range of about 15 to about 90. The weight ratio of resin to total weight of fiber and resin is in the range of about 40 to about 60%. A balanced, opposed helical pattern of said fiber is wound onto said liner layer at a helix angle in the range of about 45° to about 75°. This pattern comprises one or more layers of said fiber. The layer or layers of wetted, helically wound fiber are gelled to an elastomeric solid bonded to said binder layer. Then the resultant tubular, convexly rounded composite material is removed from the supporting member. Before or after the composite is so removed, couplings are cut from it whichf are characterized by at least one fiber layer wherein the helix angle relative to the coupling axis is substantially uniform throughout the length of the coupling.

The invention also provides a method of making a pipe. It is similar to the above method of making couplings in that it includes winding a helical pattern of the above-described fiber material and binder onto a supporting member, which may for instance be a mandrel or the above-described liner layer. After gelling of the binder, removal of the composite from the supporting member and cutting of couplings, as in the above method, the couplings are applied to a pipe section. More particularly, they are applied in telescoping relationship to one end of a pipe section having a closed, convexly rounded cross-section. The pipe should also have a circumferential rigidity so that its circumference will not change more than about 1% on application of 100 psi radial pressure thereto. To provide an interference fit between the coupling and pipe section, the latter should have a circumference greater than the inside circumference of the coupling by an amount in the range of up to about 8%. About 1/6 to about ½ of the length of the coupling is adhesively bonded to the end of the pipe section with the remainder of the length of the coupling extending free of said end.

Pipe assemblies, including the above-described couplings and pipe sections, may be combined with a trench and earth fill, the pipe assembly being disposed in the trench and covered by the fill. It is not essential that any of the couplings be adhesively bonded to any of the pipes in such assemblies. The earth tends to augment the holding power of the coupling. Also, due to the thinness of the coupling walls, the bottom of the trench can be free of sub-excavations ("bell-holes") beneath the pipe joints. The invention provides an especially advantageous technique for forming pipe assemblies from plain end vitrified clay pipe.

Other detailed and preferred aspects of the invention are set forth in the description of preferred embodiments which follows.

BRIEF DESCRIPTION OF THE DRAWINGS

A better appreciation of the invention, including the below-described specific embodiments, may be obtained with the aid of the accompanying drawings, in which.

DESCRIPTION OF PREFERRED EMBODIMENTS

Figures 1, 2:
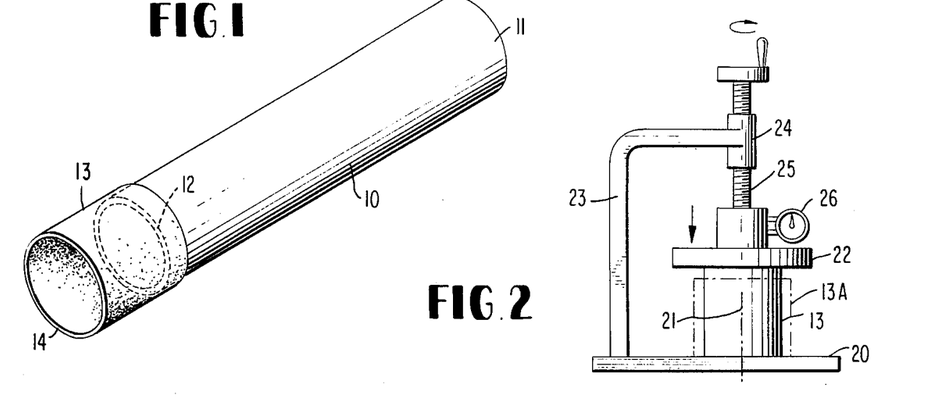
FIG. 1 is a prospective view of a coupling-pipe combination in accordance with the invention.
FIG. 2 is a schematic representation of the column expansibility property of the present invention and of a method of testing same.

FIG. 1 discloses a preferred embodiment in which one of the above-described couplings 13 is connected with a pipe section 10 to form a pipe/coupling combination. The pipe anc coupling define closed, convexly rounded figures when viewed in transverse cross-section, e.g. from the end. Examples include figures having four flat sides at right angles to one another, joined by rounded corners of substantial circumferential length; a sixteen-sided figure (which is sufficiently nearly circular to act like a rounded coupling or pipe); an oval shape or a circle. In the preferred embodiment of FIG. 1, the coupling and pipe are continuously curved cylinders, essentially rounded figures.

The pipe may be of any material which provides the indicated circumferential rigidity. There are for instance the so-called "rigid" synthetic resin pipes, such as for instance polyvinyl chloride and acrylonitrile-butadiene-styrene (ABS). More preferably, the pipe 10 has sufficient circumferential rigidity so that its circumference change will be about one tenth percent or less on application of 100 psi radial pressure, which may be internal or external pressure. In this category are metal and ceramic pipes of sufficiently great wall thickness to have the requisite rigidity. The term "ceramic", as used herein, refers generally to concrete pipe, vitrified clay pipe and other non-metallic pipes composed of inorganic material or carbon.

The outer circumference of pipe 10 is "over-size", e.g. is greater than the inner circumference of the coupling 13. The amount of oversize is sufficient to provide enough friction between the outer circumference of the pipe and the inner circumference of the coupling to cause the fibers in the coupling to move when the pipe attempts to move relative to the coupling. While the oversize of the pipe, referred to above as "interference fit", may range up to about 8%, it is preferably in the range of about 1/10 to about 6%.

With the assistance of this interference fit, the coupling end 12 of pipe 10 is grippingly engaged by the overlapping portion of coupling 13, with or without adhesive. In general, this overlap should be in the range of about 1/16 to about ½ of the length of the coupling. Preferably, the overlap is about ¼ to about ⅓ of coupling length and the overlapping portions are adhesively bonded to one another by any suitable means, such as for instance by self-bonding of the coupling to the pipe or a suitable glue. With adhesive bonding, more than about ⅓ overlap is wasteful of coupling material. The remainder of the length of the coupling, terminating in free end 14, extends free of the conduit coupling end 12. The free end 11 of the conduit 10 may be inserted into the free end of the coupling of another similar pipe/coupling combination to form a pipe joint. Free end 11 may be roughened or provided with grooves or embossment or may be adhesively bonded to assist in gripping the coupling.

Although the coupling wall thickness will generally be in the range of about 0.006 D to about 0.09 D inches, a preferred range of coupling thickness is about 0.01 D to about 0.06 D inches. Thus, in the case of a coupling intended for an 8 inch nominal diameter pipe, the preferred coupling wall thickness would range from about 0.08 to about 0.5 inches.

In general, the coupling of the invention has a L/D, length to diameter ratio, in the range of about ⅓ to about 2. A preferred value is from about 0.6 to about 1.2. Thus, in a coupling for an eight inch nominal diameter sewer pipe, a typical value of L/D is about 0.75.

When loaded as in the manner of a column, the couplings of the invention expand in a controlled fashion in relation to the applied force. To define this property, the expression "column expansibility" is used. FIG. 2 illustrates the column expansibility property of the coupling.

In the drawing, the coupling 13 stands with its central axis 21 disposed vertically, between a first flat plate, stationary table 20, and a second flat plate, movable platen 22. A vertically oriented, crank-equipped screw 25 is supported in the internally threaded portion 24 of an arm 23 extending upwardly from and above table 20. Screw 25 is connected, through any suitable force measuring device 26, with platen 22. As the crank is turned, the platen 22 exerts a measured or measurable axial compressional force on the coupling between the parallel plates. As force is applied, the coupling will shorten in length and increase in diameter as shown in phantom illustration 13A.

To conduct the test, one measures the circumference of the coupling with a tape measure both before and after compression and then calculates the circumferential increase per unit of circumference, per unit of force, per unit of circumference, in inches and pounds. The circumference measurements may be taken at one or more convenient levels of applied force below the force which would collapse the coupling. For a typical 8 inches sewer pipe coupling, such measurements have for instance been taken at force levels in the range of about 50 to 500 pounds. In general, although the couplings of the invention exhibit a column expansibility of at least about $2 \times 10^{-4}$ inches per pound, a preferable value is about $5 \times 10^{-4}$ to about $50 \times 10^{-4}$ inches per pound. An exemplary value for a commercial sewer pipe coupling would for instance be about $11 \times 10^{-4}$ inches per pound.

Figures 3, 4, 5:
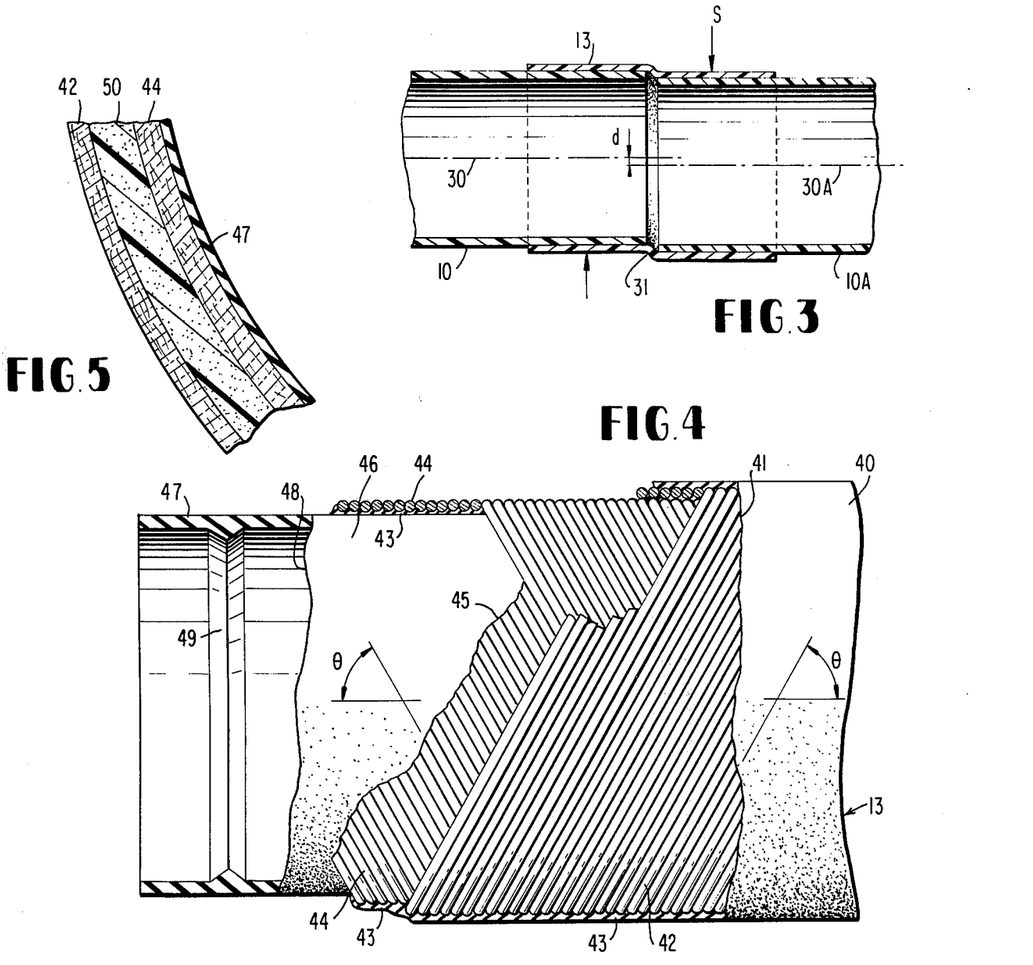
FIG. 3 is a sectional side elevation of a coupling and two conduit ends, illustrating the shear resistance of a pipe assembly in accordance with the invention.
FIG. 4 is a side elevation of a coupling-pipe combination in accordance with the invention, partially in section, with successive portions broken away.
FIG. 5 is an enlarged portion of a transverse section of a modified form, of the coupling of FIG. 4.

FIG. 3 shows a pipe joint formed by pipes 10 and 10A and coupling 13. The figure shows how the joint deforms when subjected to shear loads (loads which tend to offset the coupled ends of pipe sections perpendicularly to their axes). The shear load or force S indicated by arrow S, is applied in such a manner that the respective axes 30 and 30A of pipes 10 and 10A remain substantially parallel. Normally, the wall of the coupling 13 would be cylindrical, but shear load S produces an offset 31 in the coupling wall and a corresponding shear deflection d. Deflection d is simply the distance by which the axes 30 and 30A are displaced from one another by load S.

When subjected to shear loads, the couplings of the present invention resist these loads. To define this property, the expression "shear resistance" is employed. The conduits manifest this shear resistance by providing a deflection of, e.g. limiting the deflection to, less than 0.12 inches per inch (inches of deflection per unit of pipe diameter, nominal, in inches) when a coupling and its immediately adjoining pipe sections are transversely sheared by a shear load of 150 D pounds, while maintaining their axes essentially parallel. Preferably, the shear resistance is such as to limit deflection to about 0.047 inches per inch. An exemplary value for a commercial sewer pipe coupling would for instance be about 0.03 inches per inch.

A testing procedure applicable to couplings used in sewer pipe service may be found in ASTM standard test C-594. That test is conducted with an internal hydrostatic head. This condition, however, is the opposite of the external hydrostatic head produced by ground water. Therefore one may, if desired, test the shear resistance of the conduit of the present invention while omitting the internal hydrostatic head or substituting an external hydrostatic head. This would give a better measure of actual resistance to shear loads in service and/or to resistance against infiltration under shear load.

Certain preferred embodiments of the invention are further defined by the property of ring flexibility. This is the force per unit of deflection per unt of length when a coupling is compressed diametrically between parallel flat plates. This value can be tested or determined using the apparatus shown in FIG. 2, the coupling resting on its curved surface between the parallel plates with its axis horizontal. For purposes of these embodiments of the invention, the ring flexibility should be less than about 15 pounds per inch per inch. A typical value for a 4 inch coupling is about 12.6 psi. A more preferred range, especially for a sewer pipe coupling of about 8 inch nominal diameter is in the range of about 0.05 psi to about 3 psi, with about 1.6 pounds per inch per inch being typical.

Certain embodiments of the invention are further characterized by a sufficient coefficient of friction of the inner surface of the coupling relative to the outer surface of the pipe to cause the fibers in coupling to move when the pipe attempts to move relative to the coupling. When lubricant is present at the interface between the aforementioned surfaces, the coefficient of friction will generaly be less than about 0.5 and usually about 0.3 or less. Lubricant may be used for instance to facilitate insertion of a pipe end into the coupling. Where there is no lubricant and appreciable quantities of glass or metal fiber are present in the inner surface of the coupling, coefficients of friction which are generally more than about 0.3 and usually about 0.5 or more may be observed. Where the coupling is provided with a frictional inner layer, coefficients of friction of at least about 0.7 may be observed. There is no reason why coefficients of friction throughout the range of about 0.05 to about 1 (or even higher) may not be used Substantial coefficients of fricton are favorable from the standpoint of resisting the pulling apart of joints s a result of longitudinal and bending forces.

In FIG. 4, successive portions of a sample coupling are broken away to reveal its internal construction. Starting at the right hand end of the figure we see an optional outer cover 40 of coupling 13. This outer cover is broken away at parting line 41 to reveal a layer 42 of flaments embedded in a matrix of elastomeric binder 43. Filaments 42, in turn, are broken away to reveal filaments 44 wound in the opposite direction and also embedded in the binder 43. While only two layers of filaments have been shown in this view, merely for the sake of simplicity, it will be understood that many more layers can be provided in practice. Filaments 44 are broken away along parting line 45 to expose the optional liner layer. The exterior surface 46 of the liner layer is shown in full round between parting lines 45 and 48, the filamounts 44 being bonded directly to the liner layer by binder 43. To the left of parting line 48, the remainder of liner layer 47 is shown in a sectional mode which reveals at least one optional circumferentially continuous sealing member 49 protruding inwardly on the inner surface of the liner layer. This sealing member may have any desired cross-section, including for instance, triangular (as shown), circular or rectangular.

The optional liner layer 47 can perform one or more useful functions. It may for instance be useful in improving the impermeability of the couplings. It may also be useful for protecting the fibers from fluids passing through the pipes, especially if the fibers are deficient in chemical resistance. Some liners can improve the frictional engagement between the pipe and the coupling. A liner with a high coefficient of friction relative to the pipe affords maximum transmission of force through the smallest possible contiguous area of pipe and coupling, enabling one to use small (and therefore less costly) couplings. If the liner is a material which has a yielding surface, it will redistribute its volume over surface irregularities on the pipe surface and improve the seal.

The liner layer should be bonded directly and/or indirectly to the fiber and binder sufficiently securely to transmit loads from the pipe through the liner to the fiber. With this object in mind, it is desireable to select material and dimensions for the liner which limit its deflection under shear loads. In general, the thinner the liner layer and the higher its bulk modulus (resistancee to compression), the better will be its resistance to shear deflection and its transmission of forces. Good shear strength enables the liner to carry pull out forces and axial components of shear stress between the fibers and the pipe barrel. It is beneficial if the liner material has the properties of hardness, modulus, strength and split tear resistance in the same ranges given herein for the elastomeric binder.

Consistent with the foregoing, it is possible to employ as a liner layer any material which provides the desired chemical resistance and/or friction properties and/or permeabiliry and/or conformability. This liner may for instance be or include a layer of any thermoplastic or thermosetting rubbery material which may for instance be integral with or distinct from the innermost layer of reinforcing fiber. Particularly good results can be obtained by forming the liner layer from the same polymeric material as the binder layer described below. Other elastomers may be used.

This layer may for instance enter the coupling manufacturing process as a liquid resin, or as a preformed tube of solid rubber or resin, or as a band which is spirally wound on a forming member. The layer may also be a so-called "resin-rich layer", a layer of helical reinforcing fiber and elastomeric binder in which the resin loadinng is unusually high.

The liner may contain gritty material or even fibers with a higher coefficient of frition than those in the helically oriented fiber layer referred to above. For instance, the helically oriented fibers may be glass, while the reinforcing fibers in the inner liner may be of synthethic polymers of much lower modulus but of significntly greater coefficient of friction and chemical resistance.

As the foregoing discussion suggests, the fiber 42, 44 and elastomer binder 43 of FIG. 4 are essential structural elements of the coupling. They should be present in sufficient amount for providing the above-mentioned column expansibility and shear resistance and, when applicable, the indicated ring flexibility and coefficient of friction. Thus, one may use binder in a weight percentage of about 40 to about 60 percent, based on the total weight of fiber and binder.

While the fiber material should have a modulus of at least about $6 \times 10^6$ pounds per square inch, there is in principle no uppper limit on the modulus. The fibers may be of inorgainic (including carbon) or organic material, such as for instance steel, stainless steel, copper, aluminum alloy 2014-T6, boron, graphite, E-glass, C-glass, S-glass and aramid fibers sold under du Pont's trade name Kelvar-49 and Kelvar-29which exhibit moduli up to about $30 \times 10^6$ psi. However, E-glass and C-glass fibers, having moduli of $10.5 \times 10^6$ and $10 \times 10^6$ respectively, have proven most convenient and economical from a cost/effectiveness standpoint. Accordingly, a preferred range of modulus is from about $8 \times 10^6$ to about $13 \times 10^6$ psi. By way of comparison, the following are the moduli of certain other materials (psi $\times 10^6$): flax, 5.16; jute, 4.29; Enka rayon (HT), 2.4; cotton 2.1; Dacron type 55, 2; viscose rayon, 1,34; Enka nylon (HT), 1.17; and nylon 66 (type 200), 0.51. Still lower values have been reported for Fortrel, caprolan nylon, polyethylene and polypropylene. In general, materials which have the requisite modulus are strong enough.

Chemical properties are not significant, except to the extent that they may be involved in corrosion resistance or resin compatibility. The relationship between fiber chemistry and corrosion is in general sufficiently understood by those skilled in the art, and various fibers are commercially available with finishes which improve their resin compatibility. Also, fibers of the requisite resin compatibility may readily be selected by simple physical tests familiar to those skilled in the reinforced plastics and rubber arts.

Fibers are commercially available in a wide variety of forms. The fiber components of the coupling are not limited to a particular form, except that if the fiber component is other than a filament, it should contain fibers which are substantially uniformly oriented in a predetermined direction which corresponds, or can be made to correspond, to the desired fiber orientation in the coupling. Thus, besides continuous filaments, it is possible to use yarn, roving, woven roving, scrim, tapes, cordage and various fabrics whether of the continuous filament strand or spun strand type. The yarns may be single or plied, twisted or untwisted, finished or unfinished, but yarns and other fiber components with silane finish are preferred. The most preferred types of component are the continuous filament strand types of roving, yarn and cordage. For explanatory information on yarn or roving designations, characteristics and testing see ASTM D-578-61 (reapproved in 1972).

The fibers, in whatever form, are oriented in a helical pattern. That is, they are aligned with or follow helical lines on the peripheral surface of the coupling. The orientation is at a helix angle in the range of about 45° to about 75°, and preferably about 50° To about 65°, measured from a reference line parallel to the longitudinal axis of the coupling, with the coupling in unstressed condition.

The helical pattern or patterns are balanced, e.g. substantially equal quantities of fibers follow helical lines extending in opposite directions on the peripheral surface of the coupling. The indicated orientation can for instance be readily produced with filaments, strands, yarns, roving and cordage by known filament winding techniques, such as are described in "Filament Winding with Type 30 Roving", Owens Corning Fiberglas Corporation, May, 1974.

The helix angle should be uniform in both directions throughout the length of a given layer of helically oriented fiber, includng at the end of the layer. Preferably such uniformity exists within each helically oriented layer. Thus, if the fiber orientation is produced by that type of filament winding process in which fiber is passed back and forth along and is wound onto a rotating mandrel, it may be necessary to cut off and discard the ends of the resultant composite where the direction of the fiber changes back and forth during the windng process. Each time the fiber changes direction, its angle relative to the axis of the mandrel (and therefore also relative to the axis of the resultant coupling) shifts from a predetermined helix angle in one direction through a helix angle of 90° to the same predetermined helix angle in the opposite direction. The relatively short zones at each end of the resultant composite in which this shifting takes place are referred to as zones of reversing fiber angle. If these zones were included in the couplings, they would interfere with their operation. Thus, to provide the desired properties, these zones of reversing fiber angle are exlcuded from the couplings.

The left and right hand oriented or wound fibers may be contiguous, e.g. fibers or filaments wound to the right are wound directly upon fibers or filaments wound to the left to form one layer which contains contiguous overlapping oppositely wound reinforcement. Or, left hand reinforcement may be separated from right hand reinforcement by a spacer layer. Or, the sleeve may include separate layers of reinforcement each containing both left hand and right hand oriented filaments or fibers.

A balanced, opposed pattern in the form of a single layer may be provided, for instance, using a preformed tubular woven roving in lieu of filament winding. On the other hand, single or multiple layers of fiber may be produced by that type of filament winding process in which a plurality of filament guide bars continuously rotate in opposite directions about a stationary mandrel continuously winding fiber into a composite of indeterminant length which continuously advances as it is formed to a cutting station to be cut into segments of a length appropriate for couplings. In such a process the fiber may be wound onto a continuously extruded tube constituting an inner layer of the couplings.

More than one layer of fiber can be built upon the composites without filament winding. When working with a helix angle of 45°, in which the opposing helixes will be at an angle of 90° to one another, one can build up layers of fiber material by layup of woven roving, scrim, tape and other fabrics. However, layup techniques and fabrics can also be used when working at other helix angles, when the fabric can be distorted before or during layup, to adjust the angle between the warp and weft to give the desired helix angle.

While it is preferred that helically oriented fiber components be present throughout the entire length of the coupling, it is contemplated that some or all of the individual fiber components themselves may not extend throughout the entire length. It is sufficient, whatever type of fiber component is used, that the individual lengths of fiber component fabricated into and present in the coupling extend along at least a substantial portion of the length of the coupling. By "substantial portion" is meant a sufficient portion of the length to produce the column expansibility and shear resistance indicated above, as well as sufficient strength for the intended application. Substantial quantities of fibers may be present which are deficient in length or number of turns, or which are not oriented in the indicated manner, provided they do not prevent attainment of the desired column expansibility, ring stiffness and strength.

In its preferred form, the coupling includes at least one or a plurality of length of fiber component, e.g. filament, strand, roving, yard or cordage, which extend helically throughout the length of the coupling in one direction, and at least one or a plurality of lengths of fiber component which extend helically througout the length of the coupling in the opposite direction, in a particularly preferred embodiment, the helical pattern employed in the coupling includes a first multi-layer of fiber in which the fiber has been wound back and forth upon itself to form a plurality of sub-layers of fiber, and another distinct multi-layer in which the fiber has been wound back and forth upon itself to form a plurality of sub-layers. The distinctness of the layers may arise from the fact that they have been wound at different helix angles, or from the fact that hey have been gelled at different times, or from the fact that they are separated by some material, or from a combination of these or other factors.

While high modulus and strength are generally desirable attributes in the fiber, the binder should have relatively low modulus of elasticity and high strength. The modulus of the binder affects the axial stiffness of the coupling, and hence the force required to assemble it, e.g. to push a pipe into it. It is desirable that this stiffness be low enough to permit easy assembly. The modulus of a given binder may be reduced if desired by gelling it in a foamed condition. High strength is desirable for accommodating the large strain resulting from relative movement of individual fibers due to their close proximity and, in some cases, for obtaining the best possible utilization of the strength of reinforcing fiber which is loaded by shear forces.

Equipment for measuring the modulus of elasticity and strength of the binder material is generally available and well understood by those skilled in the art. The modulus and strength are determined with a cured solid sample of the binder without fiber and at room temperature usng ASTM test D-412.

Although the 100% modulus of the binder will in general be at least about 25 psi, it is preferably at least about 50 and more preferably about 50 to about 500 psi. A typical value for the 100% modulus of a binder used in a commercial sewer pipe coupling is about 100 to about 300 psi. The 300% modulus of the binder will in general be at least about 50 psi, preferably at least about 100 and more preferably about 150 to about 1200 psi. A typical value for the 300% modulus of a binder used in a commercial sewer pipe coupling is about 200 to about 800 psi.

If it is intended that the binder, as formulated in the composite of the invention, will contain filler or additional fibers, e.g. non-oriented fibers, the samples for strength testing will be made up with such filler and additional fibers. Although the binder, as formulated, will generally have tensile strength of at least 300 psi, it is considered preferable to use binders with a tensile strength of at least about 600 psi and more preferably about 1,000 to about 5,000 psi. A typical tensile strength for a binder used in the coupling for a commercial sewer pipe will be about 3,000 psi.

Durometer hardness is measured with an instrument familiar to those in the elastomer art. While the durometer of the binder will generally be about 15 to about 90, it is preferably in the range of about 15 to about 70 and most preferably about 40 to about 60. About 50 is a typical durometer value for the binders used in commercial sewer pipe couplings prepared in accordance with the invention.

The binder may be or include any natural or synthetic polymeric elastomer which can perform the above-described functions and possesses substantially the modulus, strength and durometer hardness properties discussed above. Thus, for instance, there are natural rubber, neoprene, styrene butadiene rubbber, polybutadiene, polyether urethanes with and without reinforcing fibers and fillers such as silica smoke, carbon black and the like. The preferred binder is formed by reacting a polyester-urethane prepolymer and a polyfunctional polyol curing system, preferably unfilled but with a compatible plasticizer. Among the commercially available polyester-urethane prepolymers, American Cyanamid Cyanaprene A-9 is preferred. While UpJohn Isonol 93 is a preferred triol curative, trimethylol propane, triisopropylanolamine and hexane triol are useful. The preferred plasticizer is Kronitex 100 triaryl phosphate, but di-(2-methoxyethyl) phthalate, Velsicol's Benzoflex 9-88 (dipropylene glycol dibenzoate) and other plasticizers are useful. Trimethyl piperazine may be used as an auxiliary catalyst to speed up curing. The preferred binder is characterized by good chemical resistance, weathering and tear resistance. For instance, the tear sensitivity (split tear in pounds per lineal inch) is generally greater than about 5 and more preferably greater than about 10 pounds per lineal inch. Thus, for instance, triol cured polyester-urethane prepolymer elastomer binders with a tear sensitivity of about 16 pli are typical in commercial sewer pipe couplings. The considerations for determining the composition of samples made up of split tear testing are the same as those for the above-described modulus and strength tests.

When constructing the couplings, one can manipulate various properties and capabilites thereof by varying the helix angle, the physical characteristics and quantity of reinforcement, the length of the joint, the coefficient of friction between the inner surface of the sleeve and the pipe material, the physical characteristics of the binder material, and the thickness and physical characteristics of the lining material, if any.

Under applied forces that tend to eccentrically displace one joined pipe from the other, such as shear loading, the helically oriented fiber reinforcement resists such displacement by a resultant component of force parallel to the direction of the applied force and perpendicular to the axis of the pipe. The shear resistance of the conduit may be increased by increasing the helix angle, modulus, strength and quantity of the fiber. Where the coefficient of friction is low, e.g. less than 0.3, influence of binder characteristics on shear resistance grows in importance. Under such circumstances, one can increase the shear resistance by also increasing the binder modulus.

How much the coupling can expand for assembly and accomodating circumferential variations in the pipe depends on the extent to which the coupling structure will permit the helix angle to change and to a lesser extent on the stiffness of the binder. A helix angle change of, for instance, about 15° may occur in couplings in which the helix angle is about 45°. This angle change will decrease as a function of an increased helix angle. The range of about 45° to about 65° should provide a minimum diametral expansion of about 4%.

By varying the helix angle of the fiber in the coupling and the coefficient of friction between the liner and the pipe, one can control the pull-out resistance of the joints formed with these couplings. Because of the interference fit between the coupling and the pipe, a slight tension $F_T$ will exist in the fiber reinforcement due to the deformation of the binder and the liner. This and the forces resulting from the deformation of the liner and the binder will have a component $F_N$ normal to the pipe surface which will provide a potential frictional resistant force $F_F$. This frictional force is equal in magnitude to the force required for assembly and is defined by the equation:

$$F_F = F_N \times B,$$

B being the coefficient of friction for the pipe and linear material. A reversal of the assembly force tending to disassemble the pipe from the coupling will act through the potential frictional resistant force $F_F$ and stresses in the liner and binder to further increase the fiber tension $F_T$. The increase in $F_T$ will result in an increase in the normal component $F_N$, thus increasing the potential frictional resistant force $F_F$.

In accordance with a preferred embodiment, a sufficiently large helix angle and coupling length may be chosen, for any given coefficient of friction and pipe diameter, so that the frictional force tending to hold the coupling and pipe together will always be greater than the pull off force and that movement of the pipe relative to the coupling will be substantially prevented until the point of fiber failure is reached. With frictional coefficients of about 0.3 to about 1 and angles of between about 75° and 45°, or with a preferred range of frictional coefficients of about 0.5 to about one, and angles in the range of 65° to 45°, economical coupling lengths can be produced.

In general, when one designs for maximum resistance against shear deflection and pulling apart, increased installation forces will result. However, various combinations of coupling structural properties and elements may be used to enhance the axial stability (column stiffness, e.g. ability to resist collapse during pipe insertion). Thus, using combinations of properties and elements described in succeeding paragraphs, one may provide a coupling with sufficient column stiffness to substantially prevent buckling of the coupling wall upon axial insertion of an unlubricated pipe end having a greater circumference, up to 8% of preferably about 1/10 to about 6% greater, than the inside circumference of the coupling. However, a different concept, involving lesser quantities of column stiffness may be applied. For instance, the coupling/pipe combinations and pipe assemblies may be designed for resistance to shear loads with minimum installation forces if one is willing to apply lubricant to the outer surface of the pipe and/or the inner surface of the coupling before assembling same. Thus, for instance, one may design the coupling with a column stiffness which is insufficient to prevent buckling of the coupling wall upon axial insertion of an unlubricated pipe end having an outside circumference that is two percent or more larger than the inside circumference of the coupling, but which is sufficient to substantially prevent buckling of the coupling wall upon axial insertion of a lubricated pipe end having said larger circumference. One may also design for substantial resistance to pulling apart and/or shear deflection while minimizing column stiffness, if one is willing to employ special techniques of assembly. An example is providing the interior of the pipe with sufficient superatmospheric pressure to avoid collapse of the couplings during pipe insertion.

In general, axial stability may be enhanced by increasing the wall thickness of the coupling or by other factors which increase the moment of inertia about the neutral axis of the section of an incremental arc of the sleeve. One simple means for increasing wall thickness is to provide the coupling with the outer cover 40 in FIG. 4. When the outer cover layer has a higher axial compressive modulus than the inner layer and reinforcement, column stability is favorably influenced. This stability is also favorably influenced if the outer skin has a higher axial compressive modulus than its circumferential tensile modulus. In this connection, the use of chopped oriented fiber in the outer sleeve may be useful. The outer cover layer may also be provided with axial ribs to achieve similar results.

If the fiber reinforcement includes an inner layer which is wound at a given helix angle within the above specified range of about 45° to about 75° and a separate or distinct outer layer of fiber wound at a helix angle which is less than that of the inner layer by about 3° to about 10°, the axial stiffness of the joint can be improved.

However, the preferred manner of providing enhanced axial stiffness is to provide separate layers of reinforcement, oriented at the same or different helix angles and spaced by a layer of binder, or other elastomer, including for instance elastomeric foam. Even though such foam material will have a substantially lower modulus than the fiber material, the resultant increase in moment of inertia can materially increase the wall stiffness, thus increasing the resistance of the coupling wall to buckling when large installation forces are involved.

FIG. 5 illustrates a particularly preferred embodiment of the invention. This embodiment may include a sealing member (not shown) similar to the sealing member 49 of FIG. 4, which projects inwardly from the inside wall of the liner layer by about 0.1 to about 0.15 inches. The liner layer 47 is in the range of about 0.010 inches to 0.040 inches thick and is formed of 50 durometer urethane elastomer of the above-described type.

Preferably there are first and second glass layers 42 and 44, separately wound and separately gelled. The first glass layer 42 is preferably in the range of about 0.03 to about 0.09 inches thick and is bonded by the same kind of polyurethane as the liner, at a helix angle in the range of about 50° to about 65°.

Between layers 42 and 44, bonded to both of them is a layer of elastomeric (typically polyurethane) foam in the range of about 0.05 to about 0.2 inches thick and having a density in the range of about 60 pounds per cubic foot. This can for instance be applied to the first glass layer soon after it has been wound so that it becomes adhesively bound to the first layer. Then, the second glass layer, preferably about 0.02 to about 0.06 inches thick, and wetted by the above-mentioned binder, can be wound onto the foam layer and gelled at the above-mentioned helix angle.

Various adjuncts may be used in connection with the preferred joint. One may for instance provide means within the coupling, in contact with the ends of the pipe sections joined thereby, for exerting a force on these pipe sections which tends to push them apart. Such means may, for instance include materials and structures which are compressed by the pipe ends when they are pushed together. Examples include Bellville and wavey washers and elastomeric rings having a diameter substantially similar to that of the pipe. One may obtain some improvement in performance by providing the couplings with a reinforced central section, e.g. which surrounds the abutting ends of the pipes in the joint. A shear ring may be molded into the inner surface of the coupling. Tightenable band-type end clamps may be fastened around the couplings near each end. However, it will be apparent that these measures will add to the cost of the coupling and/or its installation. One advantage of the invention is that satisfactory performance for a wide variety of pipe joining applications may be obtained without the use of such adjuncts.

With the object of presenting one specific example of a coupling, a coupling-pipe combination and methods of making them, an example is presented below. The example is presented without any intention of limiting the scope of the invention, since it is evident that the invention may be embodied in many different forms. All parts are by weight unless the contrary is clearly indicated.

EXAMPLE

In general, the procedure of this example includes forming a coupling for eight inch nominal diameter pipe. The coupling is formed on a convexly rounded supporting member, e.g. a mandrel 9.311 inches in diameter. Prior to the winding of the fiber, a liner layer is applied to the supporting member in the form of a liquid resin mixture of polyester-urethane prepolymer, triol curing compound and plasticizer. This layer can be cured prior to the winding of the fiber; however, it is preferred to wind the fiber as soon as practicable after gelling. The resin is considered gelled at the moment when it has increased sufficiently in viscosity to support the application of a succeeding layer, or has converted from liquid to solid form. The resin is cured when the polymerization (curing) reaction has progressed to peak exotherm or has progressed to attainment of the hardness, modulus and strength properties referred to herein. Continuous filaments, e.g. glass fiber in the form of roving, wetted with a liquid binder resin mixture of polyester-urethane prepolymer, triol curing compound and plasticizer, preferably of the same polymeric material as the liner, are drawn onto the mandrel by rotation of the mandrel. The filaments are wound while being passed back and forth along the length of the forming member, thereby forming zones of reversing fiber angle at the ends of the composite. The liner, fiber and liquid binder resin are formed with an overall thickness of about ¼ inch or less. After the binder is at least gelled and preferably cured, the composite is removed from the mandrel, and one or more couplings are cut from the composite. The zones of reversing fiber angle are excluded from the couplings, so that the helical pattern in the resultant couplings includes fibers which extend helically at a substantially uniform angle relative to the coupling axis from one end of the coupling to the other end thereof, and which terminate at said end.

The liner and binder are both based on the same polymeric material and have the same basic formulation. The base resin, having a Shore A durometer hardness of about 50, is American Cyanamid's Cyanaprene A-9 urethane resin. It is used in admixture with 10 parts of Kronitex 100 triaryl phosphate plasticizer and 11.6 parts of Upjohn Isonal-93 triol curative, per 100 parts urethane resin. The triol curative, as supplied, includes sufficient catalyst to provide a working time of about 2 hours before the mixture becomes gelled. Since a working time of about 10 minutes is sufficient for forming the liner an auxiliary catalyst, Dabco LV 33, is added to the liner formulation at a level of 0.5 parts per 100 parts of the triol curative. This type and amount of auxiliary catalyst does not appear to directly affect the hardness of the cured resin. The basic formulation, when cured with or without the auxiliary catalyst meets the test requirements set forth in Table I.

TABLE I

| Test | Test Requirements | ASTM Method |
|---|---|---|
| Chemical Resistance | | D543 (48 h at 22C) |
| 1 N sulfuric Acid | no mass loss | |
| 1 N hydrochloric acid | no mass loss | |
| Tensile Strength | 1000 psi (7 M pa) min 250% min. elongation at break | D412 |
| Hardness | 45 min – 55 max. | D2240 (Shore A durometer) |
| Accelerated oven aging | Decrease of 15% max of original tensile strength decrease of 15% max of original elongation | D573 (7 days at 70 ± 1C) |
| Compression set | decrease of 20% max of original deflection | D395 Method b (70 C for 22) |
| Water Absorption | increase of 5% max of original | D471 as follows: Immerse 0.75 inch (19 mm) by 2 inch (51 mm) by 2 inch (51 mm) specimen in distilled water at 70 C for 7 days |
| Ozone Resistance | Rating No. 1 | D1149 |

The glass roving used as fiber material is a silane-sized continuous filament strand roving with about a 675 yard per pound yield, Owens-Corning product No. 475 CA-675.

It may be desirable to conduct the procedure under the usual conditions of humidity control normally observed with urethane resins. Otherwise, it may be difficult to control the durometer value of the liner and binder.

The procedure is conveniently carried out with three ovens, one for premelting the polyurethane resin at 157° F. Another oven can be used to preheat the polyurethane components to a temperature of 220° F ± 5° prior to mixing. The third oven, also capable of maintaining 220° F ± 5°, is large enough to receive the aforementioned mandrel and includes means for rotating the mandrel at 5–20 rpm.

The present example was conducted with a Model B Explorer Filament Winding Machine, manufactured by McClean-Anderson, Inc., Milwaukee, Wis. The machine has a horizontal rotating chuck to hold the mandrel and a tranversing funnel, which is driven back and forth horizontally about 6–10 inches above the mandrel by a sprocket and roller chain traverse drive. One can disconnect the traverse drive and move the funnel to one end out of the way when it is not being used. When the funnel is in position for use, the filament is threaded from a supply above or behind the machine into the wide opening at the top of the funnel, past a plastic stopper in the narrow mouth at the bottom of the funnel and onto the mandrel. Rotation of the mandrel draws the filament from the source of supply through a supply of resin held above the stopper in the funnel and then onto the mandrel. The horizontal chuck and the drive for the funnel each have separate counters and speed controls, whereby the pitch or angle at which the filament is wound on the mandrel may be varied.

For purposes of carrying out the present invention, a sliding platform was added to the frame of the winding machine. It supports a doctor blade in front of the mandrel, which blade converges from a position above the axis of the mandrel towards its cylindrical surface. The blade has a working position in which its straightedge is close to the mandrel surface, at about the same elevation as and parallel to the mandrel axis, forming a gap 0.017 inches wide through which a level layer of liquid resin of accurately controlled thickness can be applied to the mandrel. Having the doctor blade mounted on the sliding platform enables one to back it away from the mandrel, so that it will not interfere with the winding operation.

Still another addition to the machine was a comb-like device beneath the funnel, which travels back and forth with the funnel. It enables one to feed multiple strands of roving from the funnel onto the mandrel in a flat, parallel pattern in which adjacent strands are laterally separated from one another. The spacing may be varied, but for purposes of the present example was about 1/8 inch, e.g. about equal to the width of the roving itself.

A furher addition to the winding machine was a movable holder carrying a shaft-mounted disc which is free to rotate on an axis parallel to the mandrel axis. This metal disc, having a sharp cutting edge, may be pressed against the mandrel so that it will cut through whatever material is on the mandrel at any point along the length thereof.

The mandrel is coated with Teflon and is provided with a number of blow-holes in its circumferential surface, connected through passages in the body of the mandrel with a source of high pressure air. Release of air between the mandrel surface and a coupling thereon expands the coupling and facilitates its removal. To prevent fouling of the blow holes during application of liquid resin they may, for instance, be taped shut with small pieces of very thin heat-resistant tape. The tape, along with the coupling, is dislodged by the high pressure air.

In carrying out the procedure, the urethane resin is heated in the 157° oven and melted. The mandrel is preheated to 240° F in the rotating oven. A liner batch of 150 grams of urethane resin and 15 grams of plasticizer for the liner are weighed out, heated to 220° F, mixed (while seeking to avoid excessive air entrainment) and degassed. There will be some initial foaming of the urethane resin and plasticizer, and the degassing is continued for sufficient time with sufficient vacuum merely to break the bulk of the foam initially formed. This may be accomplished in a vacuum chamber which can produce an absolute pressure of about 0.5 inches mercury in about one minute or less. The resultant mixture is placed in the 220° F oven. Following a similar procedure, a binder bath of 1200 grams of urethane resin and 120 grams of plasticizer are weighed out, heated, mixed and degassed in a separate container, which is also placed in the 220° F oven.

The winding machine is set at 60 rpm with the traverse drive for the funnel disconnected. The funnel is moved to one end out of the way. 17.4 grams of triol curative and auxiliary catalyst are placed in the 220° F oven. When the liner batch of resin and plasticizer as well as the curative reach a temperature of 220° F, they are mixed slowly for one minute and degassed for two minutes. During degassing, the preheated mandrel is inserted in the winding machine and the doctor blade is brought into working position. Following degassing of the resin-plasticizer-curative mixture, the mandrel is rotated while the mixture is poured tangent to the mandrel where the doctor blade is closest. The pouring is done from one end of the mandrel to the other at a rate which will produce a uniform full coating of the mixture without an excess of resin rolling up behind the doctor blade. After a uniform coating has been applied, the doctor blade is slowly drawn away from the mandrel and cleaned during gellation of the mixture on the mandrel. The mandrel is then placed in the rotating oven.

While the liner layer is curing on the mandrel in the rotating oven. 139.2 grams of triol curative is weighed out. While this mixture is preheated in the oven at 220° F, the winding machine is prepared for winding. After the funnel traverse drive is connected, the roving is threaded through the funnel. With the mandrel speed set at 48 rpm, the traverse speed is adjusted to 909 inches per minute to produce a helix angle of 57°. The funnel is positioned at the far left of the mandrel, from which position winding will commence, and the counters are zeroed.

When the urethane resin and plsticizer mixture as well as the curative for the binder reach 220° F, they are mixed and degassed for about two minutes while the mandrel is removed from the rotating oven and placed in the winding machine. A portion of the binder is applied to wet down the mandrel surface and a portion of it is used to fill the funnel. Unused resin is stored in the 220° F oven and withdrawn as needed. Rotation of the mandrel and winding of filament material is commenced, simultaneously winding 10 strands of roving which pass through the comb-like arrangement beneath the funnel to distribute adjacent strands laterally 1/8 inch apart from one another. Resin is added to th funnel from time to time to keep a supply of resin available. It is considered good practice to wind at a peripheral speed of about 200 feet per minute or less to obtain good penetration of the fiber by the resin. Winding ceases when a wall thickness of about 0.1 inch has been generated, e.g., when the carriage has made 52 round trips along the length of the mandrel. The mandrel is then removed from the winding machine, placed in the oven and cured overnight.

The composite formed on the mandrel has a length equivalent to several couplings. The ends of the composite are cut off to provide a composite in which the helix angle of the fiber is uniform throughout its length, using the above-described cutting disc. The remaining composite is then blown free of any bond with the mandrel and is cut on the mandrel into 6 inch lengths containing 54% by weight of urethane resin and 46% by weight of glass fiber.

The resultant couplings have an inside diameter of 9.37 inches, weight 0.17 lb./in., have a collapse force of 540 lb. and have a ring deflection of 1.57 psi, pounds of force (applied to the peripheral surface of the coupling by parallel plates perpendicular to the coupling axis) per inch of deflection per inch of length at 10% deflection. The couplings, when strained, appear substantially free of slippage at the interface between the binder and fiber, are able to return to their original shape after strain, exhibit low creep and are resistant to stress relaxation. The inner layer is sufficiently flexible to accommodate to surface imperfections in the pipe, and yet has sufficient shear strength to handle the pull-out and axial stress to which the coupling is subjected in use. The glass fiber provides substantially all of the tensile strength of the coupling. There is a balance between the helix angle and the elastomeric properties of the binder which gives a low enough installation force and adequate diametral adaptability without unacceptable loss of pull-out resistance and shear deflection resistance. The couplings provide pull-out resistance which increases in response to and substantially in proportion to pull-out force normally encounter in service.

Using Shell Epon 815 epoxy adhesive, a coupling is cemented to one end of a plain-end eight inch nominal diameter vitrified clay pipe sections having an outside diameter of 9.596 inches, ±0.095 inches. One third of the length of the six inch coupling is bonded throughout its length to two inches of the length of the pipe. Two thirds of the length of the coupling extend free of the end of the pipe.

The following coupling and joint properties and capabilities are determined on the basis of pipe/coupling combinations which have been assembled without lubricant, without additional sealants or adhesive (other than that referred to in the preceding paragraph) and without special treatment of the free ends of the pipe sections. Temperature of the water, pipe and atmosphere is in the range of about 60 to about 75° F, (about 16 to about 24° C).

Pipe coupling combinations of this type, when properly aligned, having a coupling wall thickness of up to about 0.05 D inches, can be assembled with about 25 D pounds or less of axial force on the conduit which is being pushed into the coupling. The coupling will accommodate pipe with a circumferential variations of about ±0.04 D. When the joint resulting from assembling to two such pipe-coupling combinations is tested for shear resistance using ASTM test procedure C-594 (except that the hydrostatic head is applied externally), deflection of the conduits relative to one another is about 0.06 D inches or less. The coupling will be watertight for about one hour when the hydrostatic heat is about 10 feet of water either under the applicable shear load in ASTM C-594 or at the offset in the schedule appearing in Table II below, which is Table 2 of ASTM test C-594.

TABLE II

| Nominal Diameter; in. | Deflection per Foot of Pipe Length in. (mm) |
|---|---|
| 3 to 12 incl | 1/2 (12.7) |
| 15 to 24 incl | 3/8 (9.5) |
| 27 to 36 incl | 1/4 (6.4) |
| 39 and 42 | 3/16 (4.8) |

The foregoing ASTM test procedure C-504 includes the following requirements:

Joints shall not leak when tested in either the straight position or when deflected to amounts shown in Table II. The ends of the test line shall be restrained only the amount necessary to prevent logitudinal movement. The deflection shall be determined by the distance of the free end of one pipe is moved away from the center line in any direction while the other pipe remains fixed.

Joints shall not leak when the jointed ends are either (a) subjected to a shear load in the follwing manner: a force of 150 lb. f/in. (26.2 k N/m) nominal diameter is uniformly applied over an arc of not less than 120 deg. (2.1 rad) and along a longitudinal distance of 12 in. (305 mm) at the end of one pipe immediately adjacent to the assembled joint with the other pipe adequately secured and supported on blocks placed immediately adjacent to the joint; or (b) displaced relative to one another in any direction perpendicular to the pipe axes a distance of 1/24 in/in. (0.04 mm/mm) of pipe diameter.

What is claimed is:

1. A conformable push-type shear-resistant pipe coupling;
   a. said coupling, when viewed in transverse cross-section, defining a closed convexly rounded figure with a wall thickness in the range of about 0.006 D to about 0.09 D, wherein D is the diameter in inches, of the pipe for which the coupling is intended;
   b. said couplings having
      1. a column expansibility of at least about $2 \times 10^{-4}$ inches per pound, and
      2. a shear resistance providing about 0.12 inches of pipe deflection or less per inch of D under a shear load of 150 D pounds,
   c. said couplings including a fiber-reinforced elastomer composite containing sufficient quantities of fiber and elastomer for providing the above-indicated column expansibility and shear resistance, said composite including:
      1. fibers having a modulus of at least about $6 \times 10^6$ psi, oriented in an opposed, balanced helical pattern or patterns at a helix angle in the range of about 45° to about 75°, measured from a reference line parallel to the coupling axis, which angle is substantially uniform throughout the length of the coupling in any given layer of said fibers, and
      2. elastomeric binder of substantially lower modulus than said fibers having a modulus at 100% elongation of at least about 25 psi, a tensile strength of at least about 300 psi, and a Shore A durometer hardness in the range of about 15 to about 90, for mechanically interconnecting the opposed fibers at the above-indicated helix angle.

2. A coupling in accordance with claim 1 wherein the Shore A durometer hardness of the binder is in the range of about 15 to about 70.

3. A coupling in accordance with claim 1 wherein the Shore A durometer hardness of the binder is in the range of about 40 to about 60.

4. A coupling in accordance with claim 1 wherein the tensile strength of the binder is at least about 600 psi.

5. A coupling in accordance with claim 1 wherein the tensile strength of the binder is in the range of about 1000 psi to about 5000 psi.

6. A coupling in accordance with claim 1 wherein the modulus of the binder is at least 50 psi at 100% elongation and at least 100 psi at 300% elongation.

7. A coupling in accordance with claim 1 wherein the modulus of the binder is in the range of about 50 psi to about 500 psi at 100% elongation in the range of about 150 psi to about 1200 psi at 300% elongation.

8. A coupling in accordance with claim 1 wherein the elastomer is a plasticized reaction product of a polyesterurethane prepolymer and a triol curing compound.

9. A coupling in accordance with claim 1 wherein the coupling includes a liner layer to which the fibers are bonded by the elastomeric binder.

10. A coupling in accordance with claim 9 wherein said liner layer is formed of an elastomeric material of substantially lower modulus than said fibers, having a modulus at 100% elongation of at least about 25 psi, a tensile strength of at least about 300 psi and a Shore A durometer hardness in the range of about 15 to about 90.

11. A coupling in accordance with claim 9 wherein the liner layer has an internal surface with a coefficient of friction, relative to the coupling and of the pipe with which it is intended to be used, in the range of about 0.05 to about 1.

12. A coupling in accordance with claim 9 wherein the liner layer and binder are each formed in the same polymeric material.

13. A coupling in accordance with claim 9 wherein the liner layer is a plasticized reaction product of a polyester-urethane prepolymer and a triol curing compound.

14. A coupling in accordance with claim 9 wherein the split-tear resistance of the liner is at least about 5 pounds per lineal inch.

15. A coupling in accordance with claim 9 wherein the split-tear resistance of the liner is at least about 10 pounds per lineal inch.

16. A coupling in accordance with claim 1 wherein the fiber is in the form of roving.

17. A coupling in accordance with claim 1 wherein the fiber is glass fiber.

18. A coupling in accordance with claim 1 wherein the helix angle of the fiber is in the range of about 50° to about 65°.

19. A coupling in accordance with claim 1 wherein the helical pattern includes two or more separately wound layers of fiber.

20. A coupling in accordance with claim 19 wherein the helical pattern includes a first layer of fiber and a second layer of fiber, the second layer being wound at a helix angle which is less than the helix angle in the first layer by about 3° to about 10°.

21. A coupling in accordance with claim 19 wherein the helical pattern includes a first layer of fiber, a second layer of fiber, and a layer of synthetic elastomeric foam material having a density in the range of about 20 to about 60 pounds per cubic foot and a thickness of about 0.05 to about 0.2 inches bonded to the first and second layers, between said layers.

22. A coupling in accordance with claim 19 having a first layer of fiber with a thickness in the range of about 0.03 to about 0.09 inches.

23. A coupling in accordance with claim 19 having a second layer of fiber with a thickness in the range of about 0.02 to about 0.06 inches.

24. A coupling in accordance with claim 1 wherein the helical pattern includes a first layer of fiber having a thickness in the range of about 0.03 to about 0.09 inches and a second layer of fiber having a thickness in the range of about 0.02 to about 0.06 inches.

25. A coupling in accordance with claim 24 wherein the second layer is wound at a helix angle which is less than the helix angle in the first layer by about 3° to about 10°.

26. A coupling in accordance with claim 24 wherein a layer of synthetic elastomeric foam material having a density in the range of about 20 to about 60 Pounds per cubic foot and a thickness of about 0.05 to about 0.2 inches is bonded to the first and second layers of fiber, between said layers.

27. A coupling in accordance with claim 1 having an overall thickness of about ¼ inch or less.

28. A coupling in accordance with claim 1 wherein the coupling has a length to diameter ratio in the range of about ⅓ to about 2.

29. A coupling in accordance with claim 1 wherein the coupling has a length to diameter ratio in the range of about 0.6 to about 1.2.

30. A coupling in accordance with claim 1 wherein the column expansibility is in the range of about $5 \times 10^{-4}$ to about $50 \times 10^{-4}$ inches per pound.

31. A coupling in accordance with claim 1 wherein the shear resistance provides about 0.047 inches of pipe deflection or less per inch of D under a shear load of 150 D pounds.

32. A coupling in accordance with claim 1 wherein the ring flexibility of the coupling, force per unit of deflection, per unit of length, when compressed diametrically, is less than about 15 psi.

33. A coupling in accordance with claim 1 wherein the ring flexibility of the coupling, force per unit of deflection, per unit of length, when compressed diametrically, is in the rnage of about 0.05 psi to about 3 psi.

34. A coupling in accordance with claim 1 wherein the column stiffness of the coupling is sufficient to substantially prevent buckling of the coupling wall upon axial insertion of an unlubricated pipe end having a circumference up to 8% greater than the inside circumference of the coupling.

35. A coupling in accordance with claim 1 wherein the column stiffness of the coupling is insufficient to prevent buckling of the coupling wall upon axial insertion of an unlubricated pipe end having an outside circumference two or more percent larger than the inside circumference of the coupling, but sufficient to substantially prevent buckling of the coupling wall upon axial insertion of a lubricated pipe end having said larger circumference.

36. A coupling in accordance with claim 1 having at least one circumferentially continuous sealing member protruding inwardly on the inner surface thereof.

37. A conformable push-type thin-wall shear-resistant pipe coupling:
 a. said coupling, when viewed in transverse cross-section, defining a closed, convexly rounded fibure with a wall thickness in the range of about 0.01 D to about 0.06 D, wherein D is the diameter in inches, of the pipe for which the coupling is intended;
 b. said couplings having
  1. a column expansibility in the range of about $5 \times 10^{-4}$ to about $50 \times 10^{-4}$ inches per pound, and
  2. a shear resistance providing about 0.047 inches of pipe deflection or less per inch of D under a shear load of 150 D pounds, c. said couplings including a fiber-reinforced elastomer composite containing fibers and elastomer in the range of about 40 to about 60 percent of elastomer based on total weight of fiber and elastomer, for providing the above-indicated column expansibility and shear resistance, said composite including:
1. fibers having a modulus of at least about $6 \times 10^6$ psi, oriented in an opposed, balanced helical pattern or patterns at a helix angle in the range of about 50° to about 65°, measured from a reference line parallel to the coupling axis, which angle is substantially uniform throughout the length of the coupling in any given layer of said fibers, and
2. elastomeric binder of substantially lower modulus than said fibers having a modulus of at least about 50 psi at 100% elongation and at least about 100 psi at 300% elongation, a tensile strength of at least about 600 psi, and a Shore A durometer hardness in the range of about 15 to about 70, for mechanically interconnecting the opposed fibers at the above-indicated helix angle.

38. A conformable push-type thin-wall shear-resistant pipe coupling:
a. said coupling, when viewed in transverse cross-section, defining a closed, convexly rounded figure with a wall thickness in the rage of about 0.01 D to about 0.06 D wherein D is the diameter in inches, of the pipe for which the coupling is intended;
b. said couplings having
1. a column expansibility in the range of about $5 \times 10^{-4}$ to about $50 \times 10^{-4}$ inches per pound, and
2. a shear resistance providing about 0.047 inches of pipe deflection or less per inch of D under a hear load of 150 D pounds,
3. a ring flexibility providing a force per unit of deflection, per unit of length, when compressed diametrically, of less than about 15 psi,
c. said couplings including a fiber-reinforced elastomer composite containing sufficient quantities of fibers and elastomer for providing the above-indicated column expansibility and shear resistance, said composite including:
1. a liner layer of elastomeric material of substantially lower modulus than said fibers and having the requisite chemical resistance to substantially withstand attach by acids and alkalis encountered in ordinary domestic sewage systems,
2. said fibers having a modulus of at least about $6 \times 10^6$ psi, wound upon said liner layer in an opposed, balanced helical pattern or patterns at a helix angle in the range of about 50° to about 65°, measured from a reference line parallel to the coupling axis, which angle is substantially uniform throughout the length of the coupling in any given layer of said fibers, and
3. elastomeric binder of substantially lower modulus than said fibers having a modulus of at least about 50 psi at 100% elongation and at least about 100 psi at 300% elongation, a tensile strength of at least about 600 psi, and a Shore A durometer hardness in the range of about 15 to about 70, for mechanically interconnecting the opposed fibers at the above-indicated helix angle, said binder being present in a weight percentage in the range of about 40 to about 60 percent, based on the total weight of the fiber and binder, whereby said coupling will enlarge to receive the end of a rigid conduit which is pushed into it and generate pull-out resistance which is in response to and in proportion to pull-out force and which is substantially in excess of that which would be provided by the mere hoop-stress elasticity of the elastomeric material.

39. A coupling in accordance with claim 38 wherein the fiber comprises glass fiber and the liner layer and binder layer are composed of elastomeric reaction product of polyesterurethane prepolymer and triol curing compound having a modulus in the range of about 50 psi to about 500 psi at 100% elongation, a modulus in the range of about 150 psi to about 1200 psi at 300% elongation, a tensile strength in the range of about 1,000 psi to about 5,000 psi and a split-tear resistance of at least about 50 pounds per lineal inch.

40. A coupling in accordance with claim 38 wherein the fiber comprises glass fiber and the liner layer and binder layer are composed of elastomeric reaction product of polyester-urethane prepolymer and triol curing compound having a modulus in the range of about 100 psi to about 300 psi at 100% elongation, a tensile strength in the range of about 1,000 psi to about 5,000 psi and a split-tear resistance of at least about 10 pounds per lineal inch.

41. A pipe having a conformable push-type thin-wall shear-resistant coupling, comprising
I. a flexible sleeve coupling
A. said coupling having a wall thickness in the range of about 0.006 D to about 0.09 D, wherein D is the diameter in inches, of the pipe for which the coupling is intended;
B. said coupling having
1. a column expansibility of at least about $2 \times 10^{-4}$ inches per pound, and
2. a shear resistance providing about 0.12 inches of pipe deflection or less per inch of D under a shear load of 150 D pounds,
C. said coupling including a fiber-reinforced elastomer composite containing sufficient quantities of fibers and elastomer for providing the above-indicated column expansibility and shear resistance, said composite including:
1. fiber having a modulus of at least about $6 \times 10^6$ psi, oriented in an opposed, balanced helical pattern or patterns at a helix angle in the range of about 45° to about 75°, measured from a reference line parallel to the coupling axis, which angle is substantially uniform throughout the length of the coupling in any given layer of said fibers, and
2. elastomeric binder of substantially lower modulus than said fibers having a modulus at 100% elongation of at least about 25 psi, a tensile strength of at least about 300 psi, and a Shore A durometer hardness in the range of about 15 to about 90, for mechanically interconnecting the opposed fibers at the above-indicated helix angle;
II. a pipe section to which said flexible sleeve is connected in partially overlapping telescoping relationship whereby a free portion of said coupling extends free of said pipe section:
A. said pipe section, when viewed in transverse cross-section, defining a closed, convexly rounded figure, B. said pipe section having sufficient circumferential rigidity so that its circumference will not change more than about 1% on application of 100 pounds per square inch radial pressure thereto, and C. said pipe section also having a circumference greater than the inside circumference of the coupling in the range of up to about 8%, to provide an interference fit with said coupling whereby upon insertion of another such pipe section into said free portion, said pipe shape, circumferential rigidity and interference fit may coact with said coupling to transfer shear forces from said pipe sections to the fibers in said couplings.

42. A pipe in accordance with claim 41 in which about 1/6 to about ½ of the length of the coupling overlaps and is adhesively bonded to the end of the pipe section, with the remainder of the length of the coupling extending free of said end.

43. A pipe in accordance with claim 41 wherein the pipe section is composed of vitrified clay.

44. A pipe in accordance with claim 41 including an elastomeric liner layer upon which the helical pattern is wound.

45. A pipe in accordance with claim 41 wherein the binder comprises a reaction product of polyester-urethane prepolymer and triol curing compound.

46. A pipe in accordance with claim 41 wherein the fiber comprises glass fiber and wherein the binder comprises the reaction product of polyester-urethane prepolymer and triol curing compound.

47. A pipe in accordance with claim 41 wherein the column stiffness of the coupling is sufficient to substantially prevent buckling of the coupling wall upon axial insertion of another such pipe section without lubricant.

48. A pipe in accordance with claim 41 wherein the column stiffness of the coupling is insufficient to prevent buckling of the coupling wall upon axial insertion of another such pipe section without lubricant, but sufficient to substantially prevent buckling of the coupling wall upon insertion with lubricant.

49. A conduit in accordance with claim 41 wherein the coupling has a length to diameter ratio in the range of about ⅓ to about 2.

50. A conduit in accordance with claim 41 wherein the coupling has a length to diameter ratio in the range of about 0.6 to about 1.2.

51. A pipe having a conformable push-type thin-wall shear-resistant coupling, comprising I. a flexible sleeve coupling
  A. said coupling having a wall thickness in the range of about 0.01 D to about 0.06 D, wherein D is the diameter in inches, of the pipe for which the coupling is intended;
  B. said coupling having
    1. a column expansibility in the range of about $5 \times 10^{-4}$ to about $50 \times 10^{-4}$ inches per pound, and
    2. a shear resistance providing about 0.047 inches of pipe deflection or less per inch of D under a shear load of 150 D pounds,
  C. said couplings including a fiber-reinforced elastomer composite containing sufficient quantities of fibers and elastomer in the range of about 40 to about 60 percent of elastomer based on total weight of fiber and elastomer, for providing the above-indicated column expansibility and shear resistance, said composite including:
    1. fibers having a modulus of at least about $6 \times 10^6$ psi, oriented in an opposed, balanced helical pattern or patterns at a helix angle in the range of about 50° to about 65°, measured from a reference line parallel to the coupling axis, which angle is substantially uniform throughout the length of the coupling in any given layer of said fibers, and
    2. elastomeric binder of substantially lower modulus than said fibers having a modulus of at least about 50 psi at 100% elongation and at least about 100 psi at 300% elongation, a tensile strength of at least about 600 psi, and a Shore A durometer hardness in the range of about 15 to about 70, for mechanically interconnecting the opposed fibers at the above-indicated helix angle;

II. a pipe section to which said flexible sleeve is connected in partially overlapping telescoping relationship whereby a free portion of said coupling extends free of said pipe section:
  A. said pipe section, when viewed in transverse cross-section, defining a closed, convexly rounded figure,
  B. said pipe section having sufficient circumferential rigidity so that its circumference will not change more than about 1% on application of 100 pounds per square inch radial pressure thereto, and
  C. said pipe section also having a circumference greater than the inside circumference of the coupling in the range of up to about 8%, to provide an interference fit with said coupling whereby upon insertion of another such pipe section into said free portion, said pipe shape, circumferential rigidity and interference fit may coact with said coupling to transfer shear forces from said pipe sections to the fibers in said couplings.

52. A pipe in accordance with claim 51 in which about 1/6 to about ½ of the length of the coupling overlaps and is adhesively bonded to the end of the pipe section, with the remainder of the length of the coupling extending free of said end.

53. A pipe in accordance with claim 51 wherein the pipe section is composed of vitrified clay.

54. A pipe in accordance with claim 51 including an elastomeric liner layer upon which the helical pattern is wound.

55. A pipe in accordance with claim 51 wherein the binder comprises a reaction product of polyester-urethane prepolymer and triol curing compound.

56. A pipe in accordance with claim 51 wherein the fiber comprises glass fiber and wherein the binder comprises the reaction product of polyester-urethane prepolymer and triol curing compound.

57. A pipe in accordance with claim 51 wherein the column stiffness of the coupling is sufficient to substantially prevent buckling of the coupling wall upon axial insertion of another such pipe section without lubricant.

58. A pipe in accordance with claim 51 wherein the column stiffness of the coupling is insufficient to prevent buckling of the coupling wall upon axial insertion of another such pipe section without lubricant, but sufficient to substantially prevent buckling of the coupling wall upon insertion with lubricant.

59. A conduit in accordance with claim 51 wherein the coupling has a length to diameter ratio in the range of about ⅓ to about 2.

60. A conduit in accordance with claim 51 wherein the coupling has a length to diameter ratio in the range of about 0.6 to about 1.2.

61. A conformable thin-wall shear-resistant joint and pipe assembly comprising:
   I. a plurality of flexible push-type couplings into which the ends of adjoining pipe sections have been inserted,
      A. said couplings, when viewed in transverse cross-section, defining a closed, convexly rounded figure with a wall thickness in the range of about 0.006 D to about 0.09 D, wherein D is the nominal diameter of the pipe in inches,
      B. said couplings having
         1. a column expansibility of at least about $2 \times 10^{-4}$ inches per pound, and
         2. a shear resistance providing about 0.12 inches of pipe deflection or less per inch of D under a shear load of 150 D pounds,
      C. said couplings including a fiber-reinforced elastomer composite containing sufficient quantities of fiber and elastomer for providing the above-indicated column expansibility and shear resistance, said composite including:
         1. fibers having a modulus of at least about $6 \times 10^6$ psi, oriented in an opposed, balanced helical pattern or patterns at a helix angle in the range of about 75° to about 45°, measured from a reference line parallel to the coupling axis, which angle is substantially uniform throughout the length of the coupling in any given layer of said fibers, and
         2. elastomeric binder of substantially lower modulus than said fibers having a modulus at 100% elongation of at least about 25 psi, a tensile strength of at least about 300 psi and a Shore A durometer hardness in the range of about 15 to about 90, for mechanically interconnecting the opposed fibers at the above-indicated helix angle, and
   II. a plurality of pipe sections,
      A. said pipe sections, when viewed in transverse cross-section, defining closed, convexly rounded figures,
      B. said pipe sections having sufficient circumferential rigidity so that their circumference will not change more than about 1% on application of 100 pounds per square inch radial pressure thereto,
      C. said pipe sections also having a circumference greater than the inside circumference of the coupling in the range of up to about 8%, to provide an interference fit with said coupling
   whereby said pipe shape, circumferential rigidity and interference fit may coact with said coupling to transfer shear forces from said pipe sections to the fibers in said couplings.

62. A pipe assembly in accordance with claim 61 in combination with a trench and earth fill, said pipe assembly being disposed in the trench and covered by the fill.

63. A pipe assembly in accordance with claim 62 formed of vitrified clay pipe.

64. A pipe assembly in accordance with claim 61 wherein about ¼ to about ⅓ of the length of each of said couplings is adhesively bonded to one of said pipe sections.

* * * * *